(12) United States Patent
Miyamoto

(10) Patent No.: US 9,435,423 B2
(45) Date of Patent: Sep. 6, 2016

(54) OIL SUPPLY DEVICE

(71) Applicant: Hitachi Automotive Systems Ltd., Hitachinaka-shi, Ibaraki (JP)

(72) Inventor: Shogo Miyamoto, Isesaki (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 14/775,326

(22) PCT Filed: Mar. 7, 2014

(86) PCT No.: PCT/JP2014/055930
§ 371 (c)(1),
(2) Date: Sep. 11, 2015

(87) PCT Pub. No.: WO2014/142016
PCT Pub. Date: Sep. 18, 2014

(65) Prior Publication Data
US 2016/0025207 A1    Jan. 28, 2016

(30) Foreign Application Priority Data

Mar. 13, 2013 (JP) .................. 2013-050824

(51) Int. Cl.
B60K 1/02 (2006.01)
F16H 57/04 (2010.01)
F16H 61/00 (2006.01)
B60R 17/02 (2006.01)

(52) U.S. Cl.
CPC ........... *F16H 57/0436* (2013.01); *B60R 17/02* (2013.01); *F16H 57/0435* (2013.01); *F16H 57/0439* (2013.01); *F16H 61/0028* (2013.01)

(58) Field of Classification Search
None
See application file for complete search history.

(56) References Cited

U.S. PATENT DOCUMENTS

| 5,230,402 A | * | 7/1993 | Clark |
| 5,474,428 A | | 12/1995 | Kimura et al. |
| 5,799,744 A | | 9/1998 | Yamaguchi et al. |
| 5,823,282 A | | 10/1998 | Yamaguchi |
| 5,921,342 A | * | 7/1999 | Maruyama |
| 7,487,856 B2 | * | 2/2009 | Edson |

(Continued)

FOREIGN PATENT DOCUMENTS

| CN | 102431440 A | 5/2012 |
| DE | 199 23 154 A1 | 11/1999 |

(Continued)

OTHER PUBLICATIONS

International Preliminary Report on Patentability (PCT/IB/338, PCT/IPEA/409, and PCT/IPEA/416) issued in PCT Application No. PCT/JP2014/055930 dated Sep. 17, 2015 with English translation (10 pages).

(Continued)

*Primary Examiner* — Dirk Wright
(74) *Attorney, Agent, or Firm* — Crowell & Moring LLP

(57) ABSTRACT

The present invention relates to an oil supply device for use in an automatic transmission mounted on a vehicle, and is applied to a vehicle in which an idle reduction control or the like is performed. The oil supply device includes an oil pump which is driven by a driving motor of a vehicle and a motor separate from the driving motor, and an engagement and disengagement element which transmits a driving force of the driving motor to the oil pump, and the oil pump is driven by the motor without using a drive system of the driving motor.

20 Claims, 15 Drawing Sheets

(56) References Cited

U.S. PATENT DOCUMENTS

| | | |
|---|---|---|
| 2005/0072397 A1 | 4/2005 | Sluka et al. |
| 2012/0073281 A1 | 3/2012 | Hirose et al. |
| 2012/0269653 A1 | 10/2012 | Lutoslawski et al. |

FOREIGN PATENT DOCUMENTS

| | | |
|---|---|---|
| JP | 6-193711 A | 7/1994 |
| JP | 10-169485 A | 6/1998 |
| JP | 2001-146955 A | 5/2001 |
| JP | 2004-92885 A | 3/2004 |
| JP | 2006-298246 A | 11/2006 |
| JP | 2007-320353 A | 12/2007 |
| JP | 4472935 B2 | 6/2010 |
| JP | 2011-178280 A | 9/2011 |
| JP | 2012-71752 A | 4/2012 |
| JP | 2013-36539 A | 2/2013 |

OTHER PUBLICATIONS

International Search Report (PCT/ISA/210) dated Jun. 3, 2014 with English translation (five pages).

International Preliminary Report on Patentability (PCT/IPEA/409 &PCT/IPEA/416)) dated Jun. 24, 2015 with English translation (17 pages).

Chinese-language Office Action issued in counterpart Chinese Application No. 201480014217.6 dated Apr. 22, 2016 with English translation (Fifteen (15) pages).

Japanese-language Office Action issued in counterpart Japanese Application No. 2013-050824 dated May 10, 2016 with partial English translation (Four (4) pages).

German Office Action dated Jul. 15, 2016 with partial English-language translation (8 pages).

* cited by examiner

FIG. 5

| NO. | TRAVELING SCENE | SHIFT RANGE | OWC | MOTOR | FUNCTION |
|---|---|---|---|---|---|
| (1) | ENG START | P | ON (ENGAGEMENT) | STOP | SIMILAR TO THE RELATED ART |
| (2) | IDLE | P(N)→D | ON | DRIVE (ASSIST) | OP DRIVE LOAD DECREASE |
| (3) | DEPARTURE | D | ON | DRIVE (ASSIST) | OP DRIVE LOAD DECREASE |
| (4) | ACCELERATION | D | ON | DRIVE (ASSIST) | OP DRIVE LOAD DECREASE |
| (5) | NORMAL | D | ON | DRIVE (ASSIST) | OP DRIVE LOAD DECREASE |
| (6) | NORMAL (EXCEPT FOR LOW-SPEED ROTATION) | D | ON | STOP | ENG EFFICIENCY GOOD REGION IS PREFERRED |
| (7) | DECELERATION (ENGINE BRAKE) | D | ON | STOP | SIMILAR TO THE RELATED ART |
| (8) | DECELERATION (BRAKE) | D | ON→OFF | STOP→DRIVE (OIL PRESSURE MAINTENANCE) | COASTING REDUCTION |
| (9) | STOP | D | OFF | DRIVE (OIL PRESSURE MAINTENANCE) | IDLE REDUCTION |
| (10) | STOP | D→N | OFF | DRIVE (OIL PRESSURE MAINTENANCE) | IDLE REDUCTION |
| (11) | STOP | N→P | OFF | DRIVE (OIL PRESSURE MAINTENANCE) | IDLE REDUCTION |
| (11) | STOP (ENG ACTUATION) | N→R | OFF→ON | DRIVE (OIL PRESSURE MAINTENANCE) →DRIVE (ASSIST) | OP DRIVE LOAD DECREASE |
| (12) | STOP (ENG ACTUATION) | D | OFF→ON | DRIVE (OIL PRESSURE MAINTENANCE) →DRIVE (ASSIST) | OP DRIVE LOAD DECREASE |

FIG. 7

| NO. | TRAVELING SCENE | SHIFT RANGE | OWC | MOTOR | FUNCTION |
|---|---|---|---|---|---|
| (1) | ENG START | P | ON (ENGAGEMENT) | STOP | SIMILAR TO THE RELATED ART |
| (1') | ENG START | P | OFF | DRIVE (ASSIST) | OP DRIVE LOAD DECREASE |
| (2) | IDLE | P(N)→D | ON | DRIVE (ASSIST) | OP DRIVE LOAD DECREASE |
| (3) | DEPARTURE | D | ON | DRIVE (ASSIST) | OP DRIVE LOAD DECREASE |
| (4) | ACCELERATION | D | ON | DRIVE (ASSIST) | OP DRIVE LOAD DECREASE |
| (5) | NORMAL | D | ON | DRIVE (ASSIST) | OP DRIVE LOAD DECREASE |
| (6) | NORMAL (EXCEPT FOR LOW-SPEED ROTATION) | D | ON | STOP | ENG EFFICIENCY GOOD REGION IS PREFERRED |
| (6') | NORMAL (EXCEPT FOR LOW-SPEED ROTATION) | D | ON | CO-ROTATION (REGENERATION) | ENG EFFICIENCY GOOD REGION IS PREFERRED |
| (7) | DECELERATION (ENGINE BRAKE) | D | ON | STOP | SIMILAR TO THE RELATED ART |
| (7') | DECELERATION (ENGINE BRAKE) | D | ON | CO-ROTATION (REGENERATION) | DECELERATION LOAD DECREASE IS AVOIDED |
| (8) | DECELERATION (BRAKE) | D | ON → OFF | STOP → DRIVE (OIL PRESSURE MAINTENANCE) | COASTING REDUCTION |
| (9) | STOP | D | OFF | DRIVE (OIL PRESSURE MAINTENANCE) | IDLE REDUCTION |
| (10) | STOP | D→N | OFF | DRIVE (OIL PRESSURE MAINTENANCE) | IDLE REDUCTION |
| | STOP | N→P | OFF | DRIVE (OIL PRESSURE MAINTENANCE) | IDLE REDUCTION |
| (11) | STOP (ENG ACTUATION) | N→R | OFF → ON | DRIVE (OIL PRESSURE MAINTENANCE) → DRIVE (ASSIST) | OP DRIVE LOAD DECREASE |
| (12) | STOP (ENG ACTUATION) | D | OFF → ON | DRIVE (OIL PRESSURE MAINTENANCE) → DRIVE (ASSIST) | OP DRIVE LOAD DECREASE |

OIL SUPPLY DEVICE

TECHNICAL FIELD

The present invention relates to an oil supply device for use in an automatic transmission which is mounted on a vehicle, for example, and particularly, relates to an oil supply device which is applied to a vehicle in which an idle reduction control or the like is performed.

BACKGROUND ART

In order to perform an operation, lubrication, cooling, or the like of an automatic transmission or the like mounted on a vehicle, in general, oil supply (oil-pressure supply) is performed using a hydraulic pump (mechanical oil pump) driven by an internal combustion engine (engine) which is a drive source mounted on the vehicle. The mechanical oil pump is connected to an engine, and specifications (natural discharging amount) of the pump are determined from a maximum flow rate and an engine speed required for a transmission, and are associated with the rotating speed of an engine.

Accordingly, when an idle reduction function or the like is provided on an engine, if the engine is automatically stopped, the mechanical oil pump is also stopped. As a result, the transmission may be in a neutral state or supply of oil to a clutch may be stopped due to a decrease in an oil pressure according to a kind of the engine.

If the transmission enters a neutral state, engagement of the transmission is generated when the oil pressure is increased by actuation of the engine, and vibration occurs due to a difference of rotating speeds. In addition, there may be a problem that if supply of oil for lubricating and cooling to the clutch is stopped, cooling of the clutch may be not sufficient, and the clutch may be heated.

Accordingly, there is a method in which an electric oil pump which is able to be operated independently of an engine is provided in parallel with a mechanical oil pump, oil supply (oil-pressure supply) is performed on a required portion by the electric oil pump during stopping of the engine, a predetermined oil pressure is secured even during stopping of the engine, and a state of each portion is maintained (for example, refer to Patent Document 1).

In addition, in a hybrid electric vehicle (HEV), a method is known, in which a hydraulic pump is able to be driven by both an engine and a traveling motor, and the hydraulic pump is able to be driven by input from both the engine and the traveling motor (refer to Patent Document 2,, Patent Document 3,, or the like).

In addition, in Patent Document 2,, an electric oil pump which is driven by a dedicated motor is provided in addition to a mechanical oil pump which is driven by the engine and the traveling motor, and the electric oil pump compensates for a lack in the amount of discharge in a region in which a rotating speed of the mechanical oil pump decreases.

REFERENCE DOCUMENT LIST

Patent Documents

Patent Document 1:, Japanese Patent Application Laid-open Publication No. 2007-320353
Patent Document 2:, Japanese Patent No. 4472935
Patent Document 3:, Japanese Patent Application Laid-open Publication No. 2011-178280

SUMMARY OF THE INVENTION

Problems to be Solved by the Invention

However, in the configuration disclosed in Patent Document 1,, regardless of the use limited to only the idle reduction (including a coasting reduction), intake pipes, discharge pipes, or the like are required for each of two oil pumps of the mechanical oil pump and the electric oil pump, and it is not always possible to effectively use the electric oil pump.

In addition, in techniques disclosed in Patent Document 2, and Patent Document 3,, since a HEV system is suggested, the techniques cannot be easily applied to a conventional vehicle (a non-HEV vehicle), and the size of the system also increases.

Moreover, in the technique disclosed in Patent Document 3,, since the hydraulic pump is driven by the traveling motor which is a drive source in the HEV, it is difficult to arbitrarily perform auxiliary driving such as the motor compensating a portion of an engine load according to conditions or the like.

The present invention is made in consideration of the above-described circumstances, and an object thereof is to provide an oil supply device in which simplification of a configuration is realized while an existing function is secured, a portion of a load in the driving motor is assisted, and a power load is able to be decreased.

Means for Solving the Problems

In order to achieve the above-described object, according to an aspect of the present invention, there is provided an oil supply device, comprising: an oil pump which is driven by a driving motor of a vehicle and a motor separate from the driving motor; and a first clutch which transmits and interrupts a driving force of the driving motor to the oil pump. The oil pump is selectively driven by one or both of the driving motor and the motor, the motor drives the oil pump without using a drive system of the driving motor, and the motor assists a driving force of the oil pump generated by the driving motor when the driving motor is rotated at a low speed. An OFF failure diagnosis of the first clutch is performed by confirming an oil pressure reaching a specific oil pressure in a state in which assist of the motor is not performed after the driving motor starts.

Effects of the Invention

According to the present invention, since one oil pump is selectively driven by a driving motor and a motor, the number of parts for the oil pump decreases while an existing function is secured, and simplification of a configuration is achieved. In addition, if necessary, since the oil pump is driven by both the driving motor and the motor, a portion in a load of the driving motor is assisted by the motor. Accordingly, it is possible to decrease a power load.

BRIEF DESCRIPTION OF THE DRAWINGS

FIG. 5 is a diagram for explaining an operation pattern for each traveling scene.

FIG. 7 is a diagram for explaining another operation pattern for each traveling scene.

MODE FOR CARRYING OUT THE INVENTION

Hereinafter, an embodiment of the present invention will be described with reference to the drawings.

First Embodiment

Figure 1:
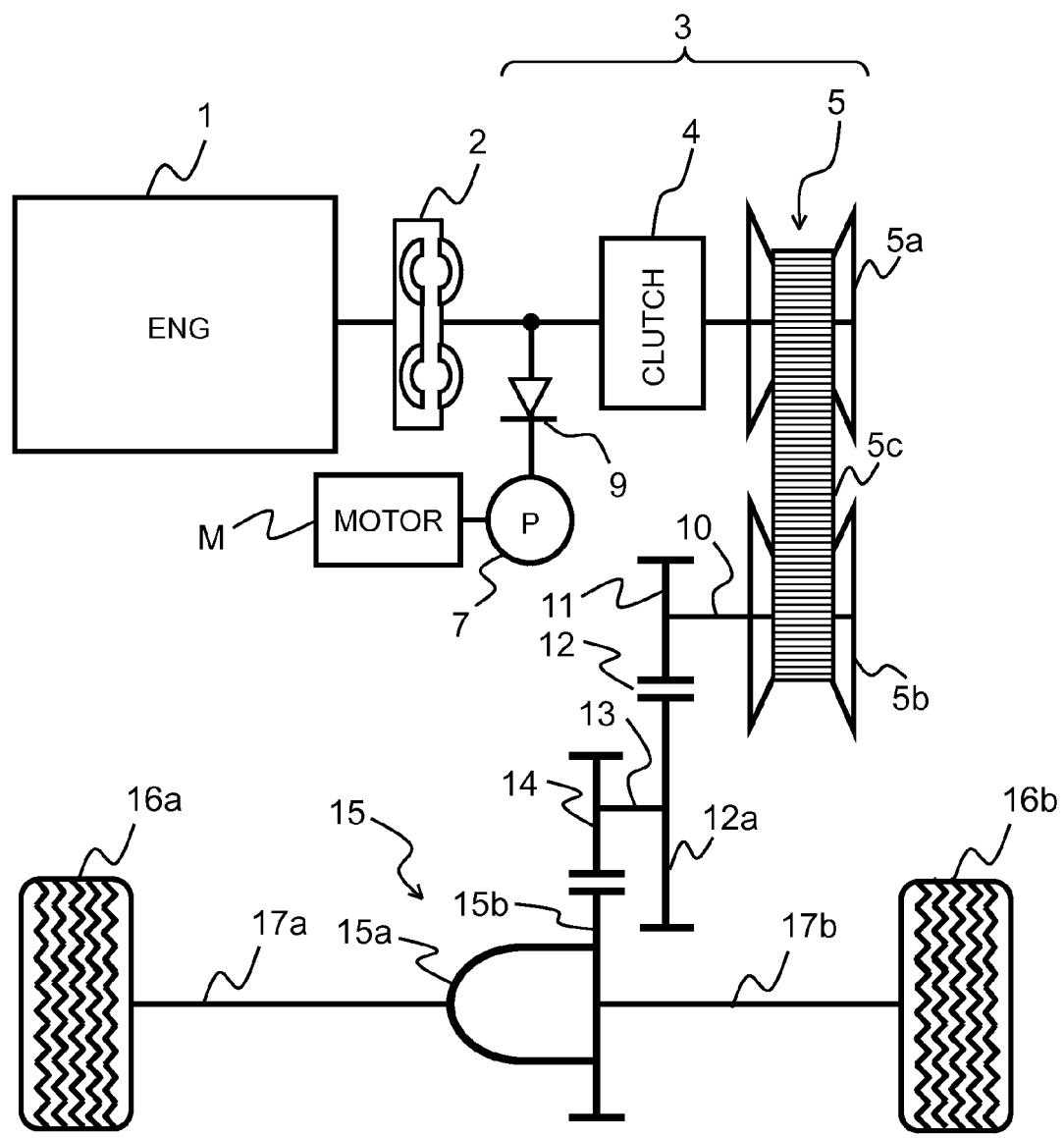
FIG. 1 illustrates an oil supply device according to a first embodiment of the present invention, and is a schematic view when the oil supply device is applied to an automatic transmission mounted on a vehicle.
Figure 2:
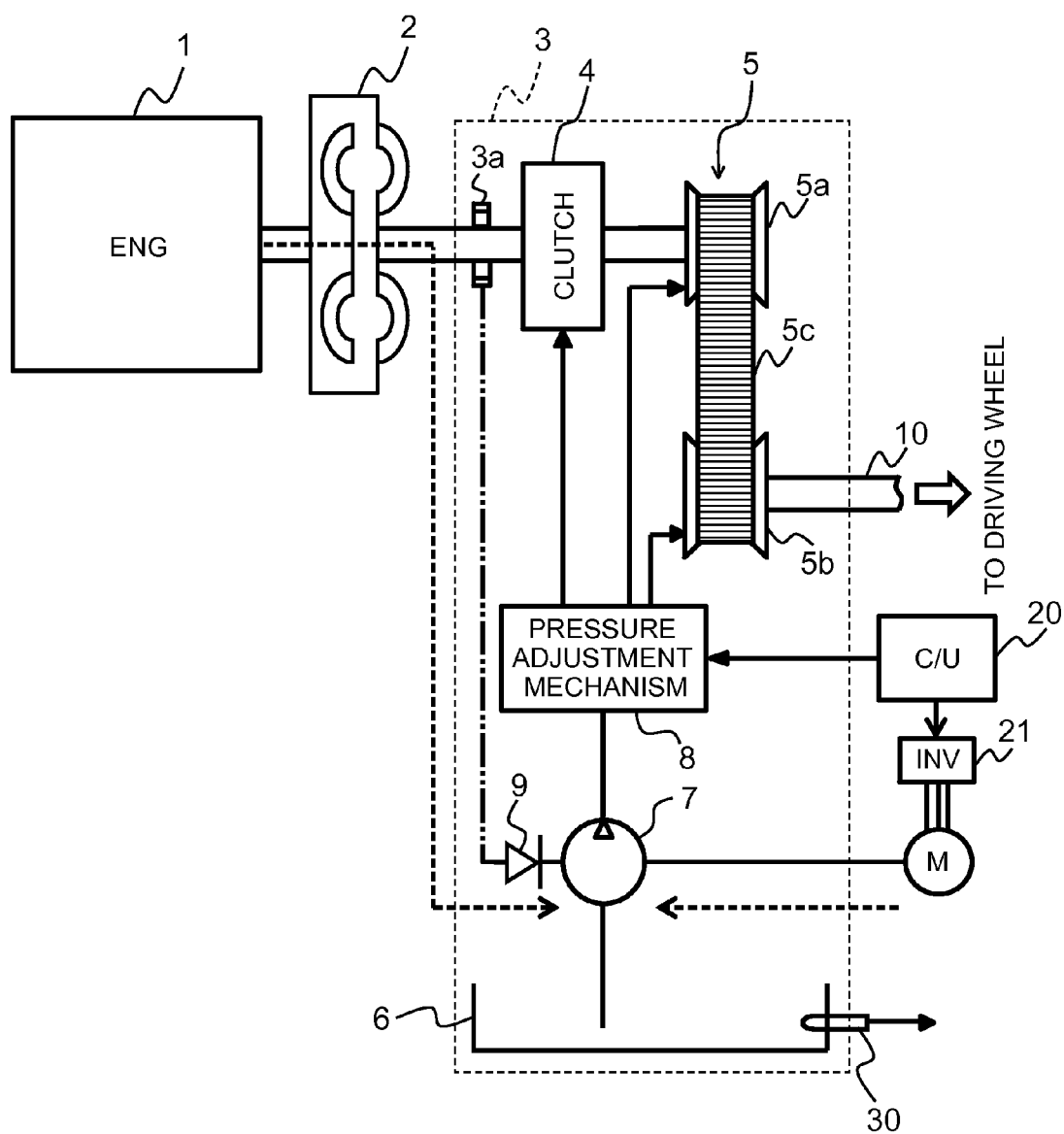
FIG. 2 is a view illustrating a main portion, which is extracted from the oil supply device illustrated in FIG. 1, in detail.

FIG. 1 illustrates an oil supply device according to a first embodiment of the present invention, and is a schematic view when a driving motor of a vehicle is an engine (internal combustion engine) and the oil supply device is applied to an automatic transmission of the engine. In addition, FIG. 2 is a view illustrating a main portion, which is extracted from the oil supply device illustrated in FIG. 1, in detail.

An engine (ENG) 1 which is a power source of a vehicle has an idle reduction function, and engine 1 is automatically stopped by stopping a fuel supply to engine 1 at a predetermined idle reduction condition. Thereafter, the fuel supply to engine 1 restarts when an idle reduction discontinuing condition is satisfied, and engine 1 is actuated.

An output shaft of engine 1 is connected to a transmission (automatic transmission) 3 via a torque converter 2. Transmission 3 is configured so as to include a clutch 4, a continuously variable transmission 5, an oil pump 7, and a one-way clutch 9 (first engagement and disengagement means) serving as an engagement and disengagement element, or the like.

Clutch 4 is configured of a multiplate wet clutch, and engagement and disengagement of clutch 4 is controlled by controlling an oil pressure of hydraulic oil. Specifically, clutch 4 is a friction engagement element in an forward-reverse switching mechanism. For example, the forward-reverse switching mechanism is configured to include a planetary gear mechanism which includes a ring gear, a pinion, a pinion carrier connected to an output shaft of an engine, and a sun gear connected to an input shaft of a transmission, a reverse brake which fixes a transmission case to the pinion carrier, and a forward clutch which connects the input shaft of a transmission and the pinion carrier to each other, and forward travel and reverse travel of a vehicle are switched by the forward-reverse switching mechanism. In this case, the forward clutch and the reverse brake which are friction engagement elements in the forward-reverse switching mechanism correspond to clutch 4.

Continuously variable transmission 5 includes a primary pulley 5a, a secondary pulley 5b, and a belt 5c, which is wound between pulleys 5a, and 5b, a rotation of primary pulley 5a, is transmitted to secondary pulley 5b, via belt 5c, and a rotation of secondary pulley 5b, is transmitted from an output shaft 10 to driving wheels 16a, and 16b.

In continuously variable transmission 5, each of a movable conical disk of primary pulley 5a, and a movable conical disk of secondary pulley 5b, are moved in an axial direction by controlling each of the oil pressures of hydraulic oil, a radius of a contact position between each of pulleys 5a, and 5b, and belt 5c, is changed, a pulley ratio (speed ratio) between primary pulley 5a, and secondary pulley 5b, is changed, and it is possible to change a transmission gear ratio in a step-less manner.

A drive shaft of oil pump 7 is connected to the output shaft of engine 1 via one-way clutch 9 and is connected to a rotary shaft of a motor M, and oil pump 7 is selectively driven by one or both of engine 1 and motor M serving as a power source.

A final gear 11 is fixed to output shaft 10 of continuously variable transmission 5. In a configuration after final gear 11, for example, a counter shaft 13 is disposed so as to be parallel with output shaft 10. Output shaft 10 and counter shaft 13 are connected to each other via a counter gear pair 12. Counter gear pair 12 is configured so that gears 12a, fixed to final gear 11 and counter shaft 13 engage with each other.

Counter shaft 13 is connected to driving wheels 16a, and 16b, via a differential gear unit 15 between driving wheels 16a, and 16b. Differential gear unit 15 includes a gear case 15a, which houses a side gear (not illustrated) connected to each of driving wheels 16a, and 16b, via each of axles 17a, and 17b, and a gear 15b which is fixed to an outer circumference of gear case 15a. A gear 14 fixed to counter shaft 13 engages with gear 15b, of differential gear unit 15. Accordingly, counter shaft 13 is connected to driving wheels 16a, and 16b, via differential gear unit 15 so that counter shaft 13 is interlocked with driving wheels 16a, and 16b, and is rotated.

As illustrated in FIG. 2, oil is stored in an oil pan 6 positioned on a bottom portion of a case of transmission 3, and the oil is drawn into and pressurized by oil pump 7 and is supplied to hydraulic actuator of each of clutch 4 and pulleys 5a, and 5b as hydraulic oil via a pressure adjustment mechanism 8.

Oil pump 7 is provided inside the case of transmission 3 and is driven by engine 1 using a sprocket 3a, provided on an input shaft of transmission 3, a drive shaft of oil pump 7 is connected to the rotary shaft of motor M, and oil pump 7 is able to be also driven by motor M. One-way clutch 9 is provided between the input shaft of transmission 3 and the drive shaft of oil pump 7. When a rotating speed of a driving portion driven by engine 1 is higher than a rotating speed of motor M, one-way clutch 9 engages engine 1 and oil pump 7 with each other, and when the rotating speed of the driving portion driven by engine 1 is lower than the rotating speed of motor M, one-way clutch 9 disengages engine 1 and oil pump 7 from each other.

One-way clutch 9 enters an engagement state when engine 1 is normally rotated and oil pump 7 is driven by a driving force of engine 1. Meanwhile, when engine 1 is stopped due to an idle reduction or the like and the rotating speed of motor M is higher than the rotating speed of the driving portion, one-way clutch 9 enters a disengagement state, and oil pump 7 is driven by a driving force of motor M. In addition, when oil pump 7 is driven by engine 1, a driving force from motor M is applied to oil pump 7 if necessary, which is able to assist the driving force of engine 1. In this way, as illustrated by dashed arrows, oil pump 7 is selectively driven by one or both of engine 1 and motor M which are power sources.

Here, it is assumed that capacity of motor M is capacity (driving force) which is approximately used in idle reduction normally. Accordingly, basically, even when motor M is rotated at the maximum rotating speed or the maximum output, the output of motor M is smaller than the output of engine 1, and the rotation of motor M does not exceed the rotation of the oil pump driven by the engine.

Pressure adjustment mechanism 8 includes an electronic valve having a relief function for each supply portion (each of clutch 4 and pulleys 5a, and 5b). Under a control of a control unit (C/U) 20 which is configured so as to include a microcomputer, pressure adjustment mechanism 8 adjusts a discharging pressure of oil pump 7 so as to be a target pressure of each supply portion and supplies the adjusted oil to each supply portion. Accordingly, switching between forward travel and reverse travel of a vehicle, and a control of a transmission gear ratio are performed. In addition, based on the control of control unit 20, an inverter (INV) 21 converts a power supply voltage (direct current voltage) into an alternating current voltage using a PWM control (a control which generates a voltage, in which a pulse width is changed in a constant period, so as to artificially obtain a sine wave), and supplies the converted voltage to motor M.

Oil pump 7 not only supplies oil serving as hydraulic oil to clutch 4 and pulley 5a, and 5b, via pressure adjustment mechanism 8 but also supplies oil for lubrication and cooling to each portion of transmission 3. The supplied oil is returned to oil pan 6 and is recirculated. An oil temperature sensor 30 is provided in oil pan 6.

Figure 3:
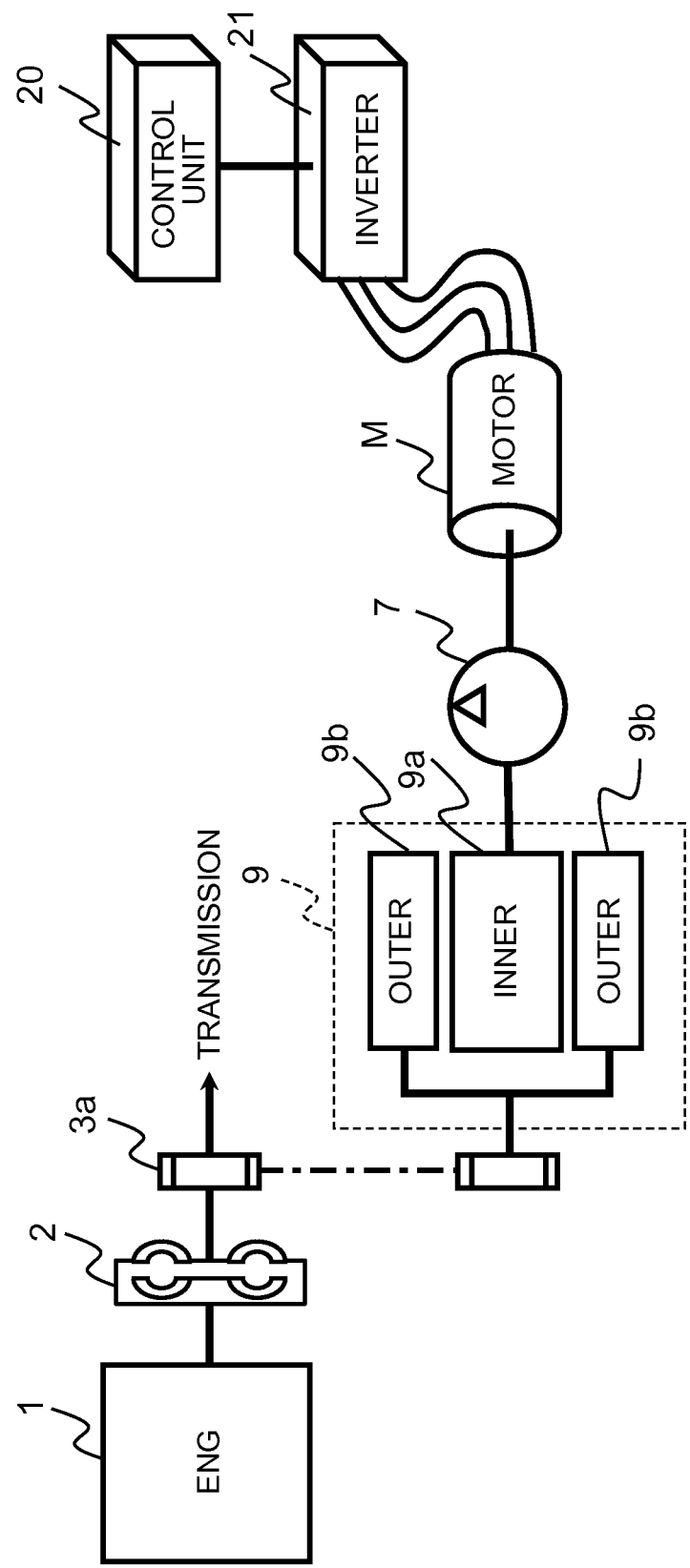
FIG. 3 is a view illustrating a configuration example of an engagement and disengagement element in the oil supply device illustrated in FIGS. 1 and 2.

FIG. 3 illustrates a configuration example of one-way clutch 9 in the oil supply device illustrated in FIGS. 1 and 2. In FIG. 3, the same reference numerals are assigned to the portions corresponding to those of FIGS. 1 and 2.

When motor M is switched from a stop state to a drive state, since a side having smaller inertia is advantageous from the viewpoint of responsiveness, in the present example, an output shaft (pump shaft) side of motor M is connected to an inner 9a having smaller inertia of one-way clutch 9, and outers 9b, and 9b, are connected to an output shaft side (drive system) of engine 1 by sprocket 3a.

In the above-described configuration, when rotations of outers 9b, and 9b are greater than the rotation of inner 9a, one-way clutch 9 enters an ON (engagement) state, and oil pump 7 is driven by the driving force of engine 1. Meanwhile, when rotations of outers 9b, and 9b, are smaller than the rotation of inner 9a, one-way clutch 9 enters an OFF (disengagement) state, and oil pump 7 is driven by the driving force of motor M. Accordingly, power switching of oil pump 7 at the time of the idle reduction is able to be performed using a difference between the rotating speeds of engine 1 and motor M.

In this configuration, since one oil pump 7 is selectively driven by engine 1 and motor M, it is possible to decrease the number of oil pumps, and parts for an electric oil pump (ELOP), such as, a pump gear, a pipe, a strainer, and a relief valve, are not required. In addition, it is possible to follow a conventional operation of a vehicle by engaging one-way clutch 9 when an engine is driven. Accordingly, it is possible to simplify a configuration while securing an existing function. In addition, when abnormality occurs in motor M, since oil pump 7 is driven by engine 1 so as to supply oil, it is possible to minimize the influence on traveling.

In addition, since the output shaft (drive system) of engine 1 is separated from the drive shaft of oil pump 7 by one-way clutch 9, it is possible to minimize a load when driving is performed by motor M. Moreover, by using one-way clutch 9, it is possible to perform engagement and disengagement between the output shaft of engine 1 and oil pump 7 without using oil pressure.

Moreover, the relationship between inner 9a, and outers 9b, and 9b, of one-way clutch 9 is able to be reversed. For example, when there is a margin for the driving force of motor M and preference is given to a decrease of an engine load rather than responsiveness, the output shaft side of motor M may be connected to outers 9b, and 9b, of one-way clutch 9, and inner 9a, may be connected to the output shaft side of engine 1 by sprocket 3a.

Figure 4:
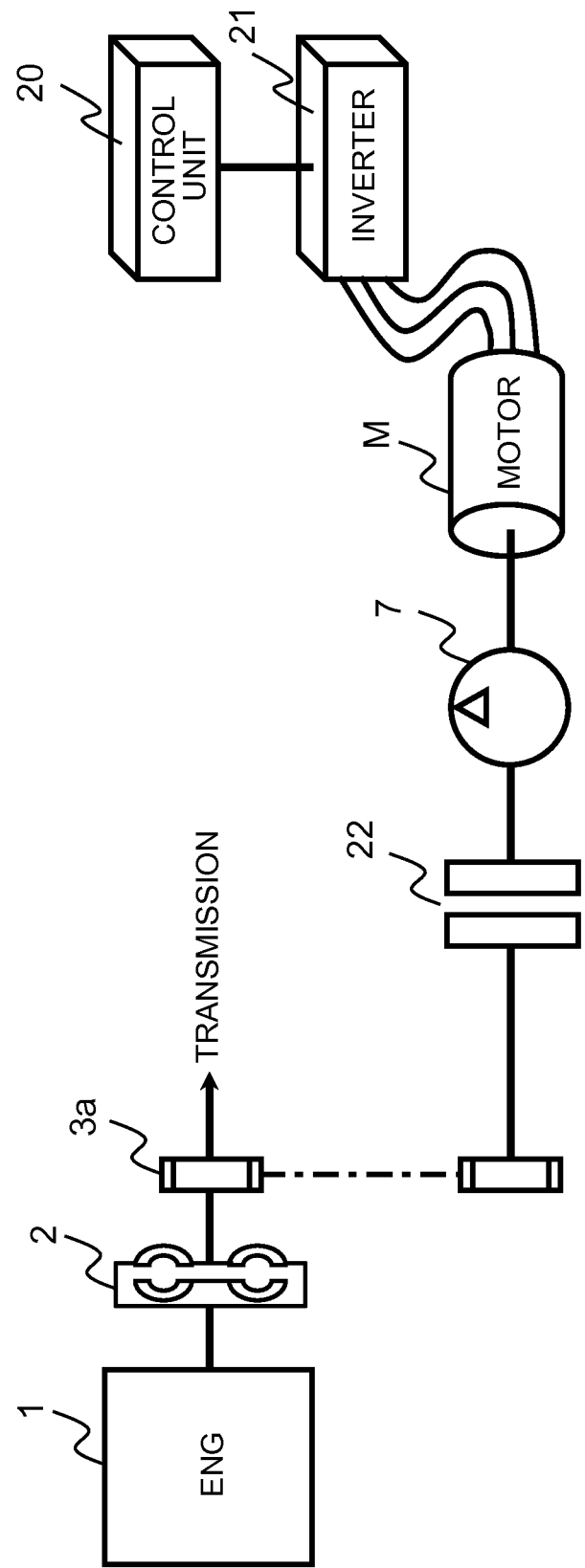
FIG. 4 is a view illustrating another configuration example of the engagement and disengagement element in the oil supply device illustrated in FIGS. 1 and 2.

FIG. 4 is a view illustrating another configuration example of the engagement and disengagement element in the oil supply device illustrated in FIGS. 1 and 2. In the present example, instead of one-way clutch 9, a mechanical clutch 22, such as, a friction clutch, a claw clutch, a single plate clutch, a centrifugal clutch, and an electromagnetic clutch, is used. When mechanical clutch 22 is driven by engine 1, mechanical clutch 22 enters an engagement state (clutch ON), and when mechanical clutch 22 is driven by motor M, mechanical clutch 22 enters a disengagement state (clutch OFF).

Here, if disengagement of mechanical clutch 22 cannot be performed due to abnormality of a clutch actuator, a vehicle cannot travel. In addition, since it is necessary to continuously add an oil pressure during traveling in the disengagement state, a loss in energy occurs. Accordingly, normally, it is preferable that the state of the clutch is an engagement state (normal CLOSE). In addition, it is preferable that clutch OFF is performed at a time point when the motor reaches a predetermined rotating speed (necessary flow rate) after the motor is driven. This is because a flow rate of oil may be not sufficient if the clutch OFF is performed in a state in which the rotating speed of motor M is not sufficient.

In the above-described descriptions, the case in which one oil pump 7 is driven by switching engine 1 and motor M is described. However, oil pump 7 can be driven by both engine 1 and motor M, and motor M is able to assist the driving force of oil pump 7 generated by engine 1. In this case, to make it possible to assist the driving force of oil pump via one-way clutch 9, a target rotating speed of motor M is set so as to be equal to or more than the rotating speed of engine 1. Moreover, when mechanical clutch 22 is used, since the engagement/disengagement is not dependent on the rotating speed of engine 1 and torque of motor M becomes an amount of assist as it is, it is possible to easily set the rotating speed of motor M according to an assist target, and it is possible to decrease a degree of difficulty of a motor control (oil pump assist).

The example in which capacity of the motor is relatively small as used in a normal idle reduction is described. However, if capacity of the motor is large, it is possible to suitably control motor M in accordance with a required amount of the oil without depending on the driving force (traveling state) of the engine. That is, since one-way clutch 9 is disengaged at the time of the idle reduction, it is possible to supply a required amount of oil by motor M. In addition, if there is a margin for the capacity of the motor, a suitable flow rate is able to be set within the range. Moreover, a driving force exceeding an oil-pressure holding region of oil is able to be used for the assist. In this way, if the capacity of the motor increases, it is possible to increase a degree of freedom in use.

EXAMPLE 1

Figure 6:
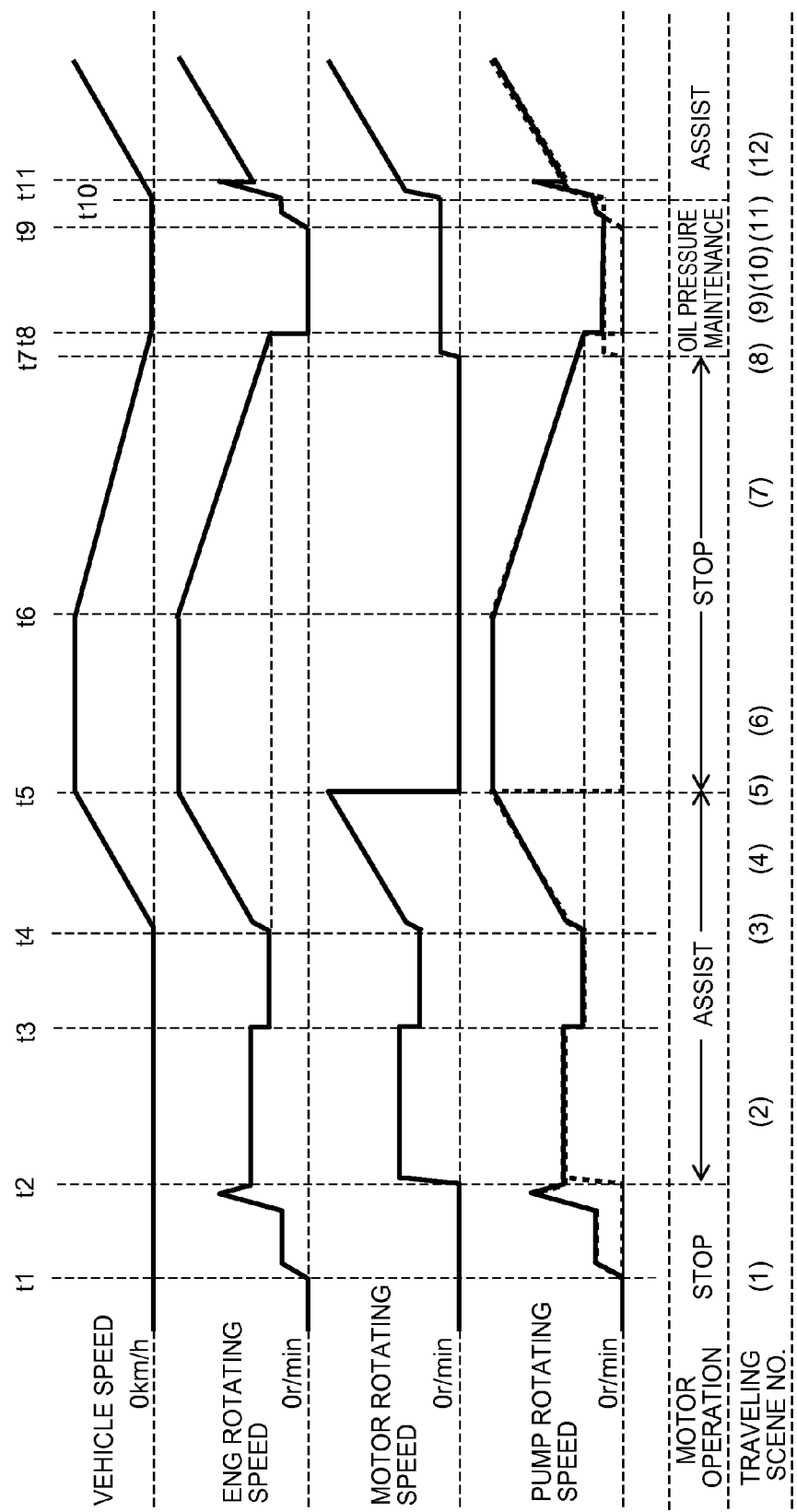
FIG. 6 is a timing chart illustrating a relationship between a vehicle speed, an engine speed, a motor rotating speed, and a pump rotating speed, and a motor operation and a traveling scene in the operation pattern illustrated in FIG. 5.

FIG. 5 is a diagram for explaining an operation pattern for each traveling scene. In addition, FIG. 6 is a timing chart illustrating a relationship between a vehicle speed, an engine speed, a motor rotating speed, and a pump rotating speed, and a motor operation and a traveling scene in the operation pattern illustrated in FIG. 5. In the present Example 1,, motor M is driven according to a driving condition of a vehicle.

Here, a series of operations is illustrated in which after a vehicle starts from an engine stop state, departs, is accelerated, and reaches a normal traveling state, the vehicle is decelerated and stopped (with coasting reduction or idle reduction), and the vehicle is restarted. In addition, it is assumed that there is a margin for the power of a battery, and not only is an oil pressure maintained at the time of coasting reduction or idle reduction, but also engine 1 is assisted by motor M in an idling state, a start state, and an acceleration state.

In this assist, motor M is rotated so that the speed is equal to or more than the rotating speed of oil pump 7. If an assist amount is too great, since the rotating speed of the pump is too great and waste occurs, the rotating speed of motor M is set so as to generate a suitable assist amount. For example, the minimum value of the assist amount may be determined from drive torque of engine 1 (which is changed by an oil temperature) at the time of creep which is considered a time when a load is smallest. Preferably, whether or not the assist is performed is determined when there is a margin for power considering at least the battery remaining amount. In addition, for example, more preferably, this determination is performed considering whether or not a temperature of the battery is too low, whether or not a failure flag such as a case in which motor M is not operated is set, or the like.

Before engine 1 starts, similar to the related art, a shift range is set to parking P, one-way clutch (OWC) 9 is set to ON (engagement), and motor M is in a stop state. When a starter is operated at time t1, engine 1 is started, the engine speed increases, and the pump rotating speed also increases according to this. At this time, motor M is in a stop state.

Moreover, when the engine is started at time t2, the engine speed and the pump rotating speed are stabilized at a predetermined rotating speed, and the state enters an idle state. Driving performed by motor M starts from time t2, motor M is rotated at approximately the same rotating speed (more precisely, a drive current which is converted into a slightly high rotating speed at the time of no load) as an idling rotation, and the driving force of oil pump 7 generated by engine 1 is assisted by motor M. In this case, since motor M does not reach an instructed rotation, a current flowing to motor M is increased by feedback correction, or the like. However, the current is stabilized at a limited current state. Alternatively, in this case, a method of determining a limit value based on a dedicated assist target may be adopted. If oil pump 7 is rotated by engine 1, torque generating friction is generated. Accordingly, by performing the assist using motor M, it is possible to decrease the driving force of engine 1, and fuel consumption decreases.

In order to start a vehicle, a shift operation is performed from parking P (or neutral N) to drive D at time t3, the engine speed, the motor rotating speed, and the pump rotating speed are temporarily decreased due to an increase of a load. Continuously, if a vehicle is started at time t4 and acceleration of the vehicle starts, the rotating speed of each of engine 1, motor M, and oil pump 7 increases according to an increase of a vehicle speed. In this case, since assist with respect to driving of the oil pump is performed by motor M, a load of the engine decreases, which contributes to improvement of fuel consumption, or the like.

When the vehicle enters a normal travel state at time t5 and the engine speed and the vehicle speed are constant, the assist performed by motor M stops except when engine 1 is driven at a low rotation speed, and oil pump 7 is driven by only the driving force of engine 1. That is, at an engine speed in which engine efficiency is improved, for example, at 4000, r/min or more, the driving force of engine 1 is preferentially used to drive oil pump 7. In this way, if the engine speed increases, a region having improved efficiency of engine 1 increases and assist effects decrease. Accordingly, when the assist is positively performed at a low-speed rotation in which efficiency of engine 1 is low, fuel consumption improvement effects increase. In addition, by performing the assist during a rapid acceleration in which a load of engine 1 is large, improvement on fuel consumption is able to be expected.

Thereafter, if deceleration is started by an engine brake at time t6, the engine speed and the pump rotating speed decrease according to a decrease of a vehicle speed. At the time of the deceleration, power is accumulated in a battery by generating electricity using an alternator. An operation of the deceleration is similar to that of the related art. Subsequently, when a brake operation is performed and a vehicle reaches a low speed which is less than or equal to a predetermined speed (time t7), one-way clutch 9 is disengaged (from ON to OFF) due to a decrease of the rotating speed of engine 1, oil pump 7 is driven by motor M, and an oil-pressure holding operation starts.

In this state, oil pump 7 is maintained at a predetermined pump rotating speed by driving motor M. In this way, oil pump 7 is driven by motor M immediately before the engine is stopped by the idle reduction so as to prepare the idle reduction. A start timing of preparing idle reduction is determined from a time (for example, a time with respect to the idle reduction being generated after how many milliseconds by a temperature), or a measured value of an oil pressure considering responsiveness of an oil pressure according to driving of the motor.

In addition, in a case of coasting reduction, if the vehicle speed reaches a predetermined low speed, for example, 10, km/h or less, engine 1 is stopped. Accordingly, oil pump 7 is driven by motor M immediately before the engine is stopped by the coasting reduction so as to prepare the coasting reduction.

When the vehicle stops (vehicle speed is 0, km/h), engine 1 is stopped by the idle reduction (time t8). In this case, one-way clutch 9 is in a disengagement state, the oil pressure is maintained according to the driving of oil pump 7 by motor M, and a predetermined pump rotating speed of oil pump 7 is maintained.

Here, since fuel consumption cannot be improved during deceleration (during fuel cut) or the like, at the time of the idle reduction after a vehicle is stopped from deceleration, assist by motor M is not performed. When the oil pressure is maintained at the time of the idle reduction, since oil only has to be able to be supplied to replenish oil leaking from pulleys 5a, and 5b, or clutch 4, a load of motor M may be relatively small. In order to secure the oil pressure, motor M is controlled by a current so that oil supplied from oil pump 7 reaches a required flow rate, or oil pump 7 is controlled by motor M so that oil pump 7 reaches a predetermined rotating speed.

Thereafter, the engine is actuated at time t9, the shift range is converted from neutral N into reverse R or drive D, and when the vehicle is started at time t10, one-way clutch 9 is shifted from OFF (disengagement) to ON (engagement), and motor M is shifted from an oil-pressure holding operation to an assist operation. A switching condition of this control is when "engine drive rotating speed>motor rotating speed" is satisfied. In addition, after the engine speed is stabilized at time t11, similar operations are repeated according to driving conditions of a vehicle such as acceleration, a normal travel state, deceleration, a predetermined speed or less or stopping.

As described above, since one oil pump 7 is selectively driven by engine 1 and motor M, it is possible to secure an oil pressure at the time of idle reduction (at the time of coasting reduction) performed by motor M while simplifying a system configuration. In addition, since oil pump 7 is driven by both engine 1 and motor M, it is possible to provide a new function such as the driving force of engine 1 being assisted by motor M and a power load of the engine being decreased. The decrease of the power load of the engine contributes to improvement of fuel consumption.

Accordingly, simplification of a configuration is achieved while existing functions are secured, and it is possible to decrease a power load by assisting a portion of a load of the driving motor (engine).

In addition, when oil pump 7 is switched from driving of oil pump 7 by motor M to driving of oil pump 7 by engine 1, if the driving of motor M is not stopped at a good time, the driving of motor M becomes a load of the driving by engine 1. Conversely, when oil pump 7 is switched from the driving of oil pump 7 by engine 1 to the driving of oil pump 7 by motor M, if the rotation of motor M is not started at a good time, engine 1 becomes a load. Accordingly, it is necessary to consider setting of the timing of the switching operation.

EXAMPLE 2

Figure 8:
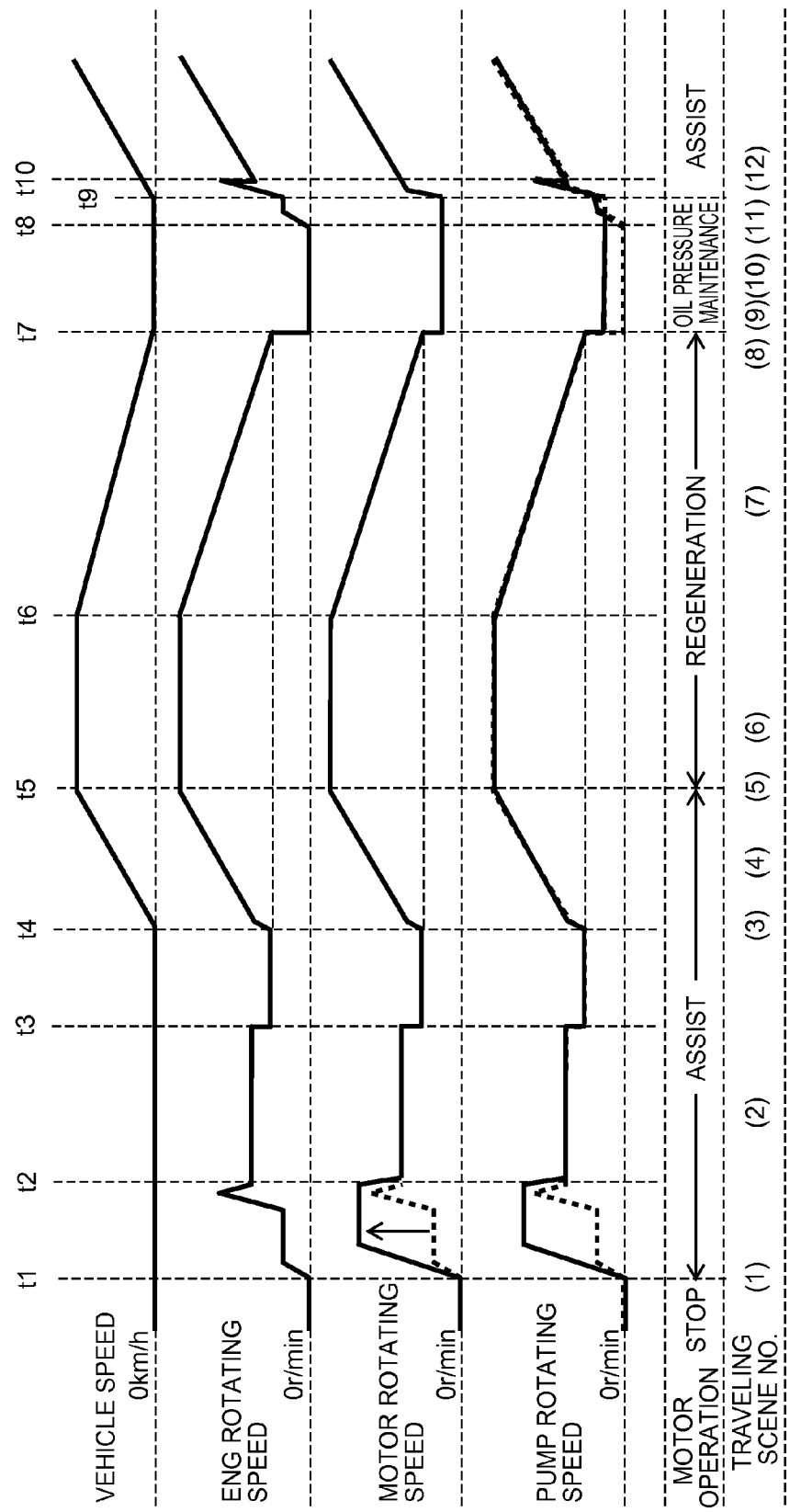
FIG. 8 is a timing chart illustrating a relationship between a vehicle speed, an engine speed, a motor rotating speed, and a pump rotating speed, and a motor operation and a traveling scene in the operation pattern illustrated in FIG. 7.

FIG. 7 is a diagram for explaining another operation pattern for each traveling scene, and motor M is driven according to a driving condition of a vehicle. In addition, FIG. 8 is a timing chart illustrating a relationship between a vehicle speed, an engine speed, a motor rotating speed, and a pump rotating speed, and a motor operation and a traveling scene in the operation pattern illustrated in FIG. 7. Similar to the above-described Example 1,, in the present Example 2,, motor M is driven according to a driving condition of a vehicle.

Here, a series of operation is illustrated in which after a vehicle is started from an engine stop state, departs, is accelerated, and reaches a normal traveling state, the vehicle is decelerated and stopped (with coasting reduction or idle reduction), and the vehicle is restarted. In addition, an oil pressure is maintained at the time of the coasting reduction or the idle reduction, engine 1 is assisted by motor M at the time of starting, idling, departure, acceleration, and a normal state of engine 1, and regeneration is performed at the time of a normal traveling or deceleration using co-rotation generated when motor M is connected to the drive shaft of oil pump 7.

That is, as illustrated in a traveling scene No. (1), when one-way clutch 9 is in the engagement state before engine 1 is started, an operation similar to FIG. 5 and the related art is generated. Meanwhile, as illustrated in a traveling scene No. (1'), since disengagement of one-way clutch 9 is performed before engine 1 is started, oil pump 7 is driven by only motor M during a period (between time t1 and time t2) until engine 1 is started. By setting the motor rotating speed so as to be higher than the engine speed as illustrated in an arrow between time t1 and time t2 of FIG. 8, the pump rotating speed is also increased in proportion to the motor rotating speed, one-way clutch 9 enters a disengagement state, a load of engine 1 is able to be decreased, and it is possible to assist engine starting.

Specifically, in a case in which there is a margin for power of a battery, when a starter is rotated, by driving motor M in a normal rotation direction during a period from before the starter rotates to before engine 1 is initially combusted after signals for starting engine are received, starting is assisted by motor M. In this case, preferably, motor M is rotated at a speed equal to or more than a rotating speed which motor M reaches when the engine starts, for example, at a rotating speed which is higher than approximately 300, r/min to 500, r/min by the starter.

Since capacity (power) of the starter is determined, it is possible to reliably reduce a load by oil pump 7, and since the starter is rotated early as a start load decreases, it is possible to improve responsiveness. As a result, according to early driving of oil pump 7, responsiveness of an oil-pressure supply is improved, and a drive load of the starter decreases.

In addition, as illustrated in traveling scenes Nos. (6') and (7'), since one-way clutch 9 is in an engagement state in a normal state (except for a low-speed state) and a deceleration (engine brake) state, motor M is co-rotated with engine (is regenerated). In this case, in traveling scene No. (6'), regeneration is able to be performed by motor M. In traveling scene No. (7'), it is possible to avoid a decrease of a load of engine brake when electricity generated by the alternator is at the maximum value, and it is possible to increase braking of the engine.

Moreover, in traveling scene No. (9), motor M is not stopped by the idle reduction, and it is possible to stop motor M by failure of other permission conditions of the idle reduction such as brake off or a belt of driver's sheet.

In addition, the motor rotating speed is set to values different from each other at the time of starting of the engine and at the time of actuation of the engine (at the time of discontinuing of the idle reduction), and the engine speed at the time of starting of the engine is higher than that at the time of actuation of the engine in order to perform warming up at the time of starting. Accordingly, it is preferable that the set value satisfies "the time of starting≥the time of actuation".

In addition, the motor rotating speed at the time of starting of the engine may be set so that a rotating speed of the engine to be reached is predicted based on any one of a water temperature, an oil temperature (engine, transmission, and decelerator), an ambient temperature, or the history of a rotating speed (engine, motor) at the time of previous starting. Moreover, the motor rotating speed may be corrected using the history at the time of previous starting.

Second Embodiment

Figure 9:
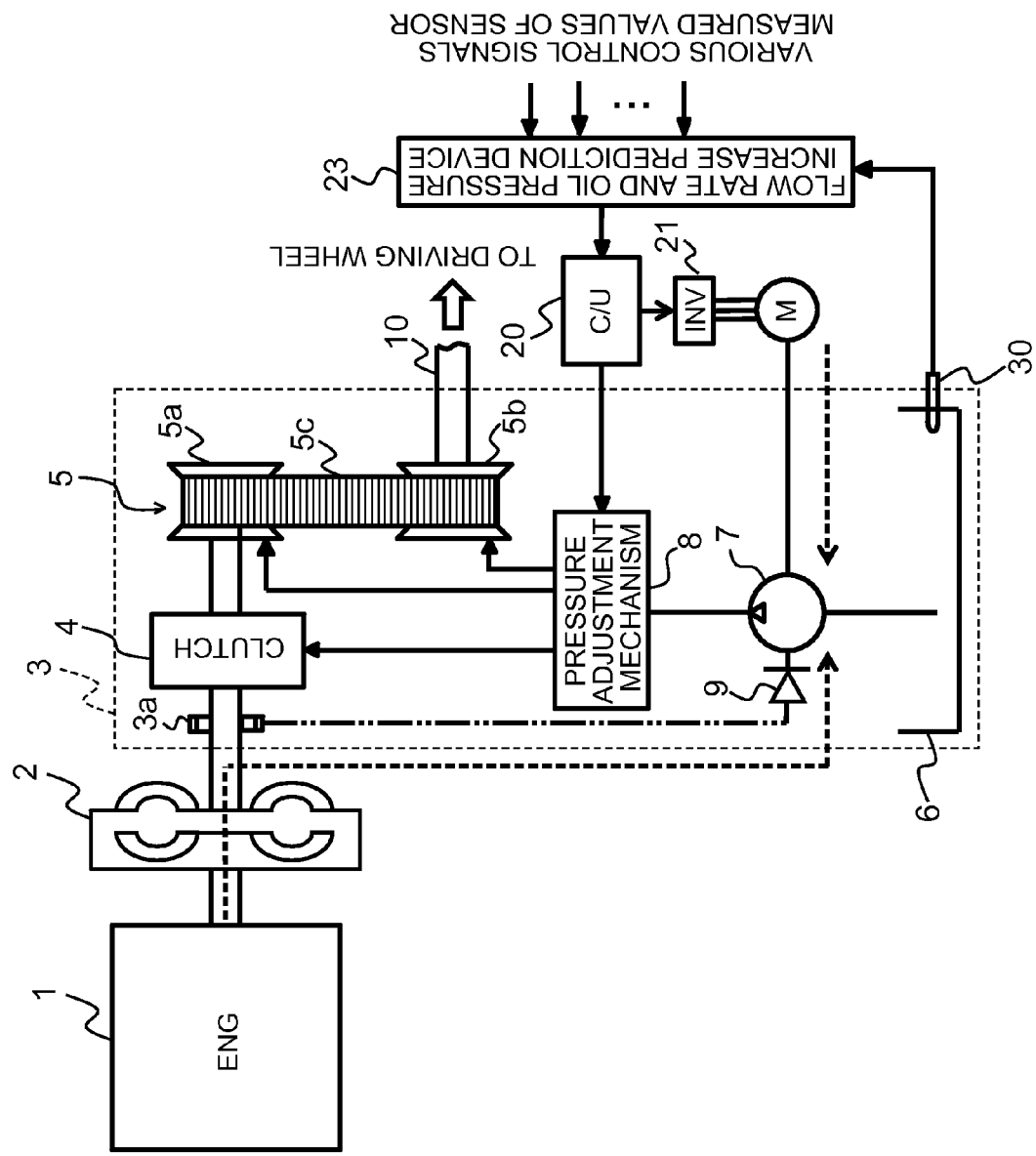
FIG. 9 is a view illustrating a main portion, which is extracted from an oil supply device according to a second embodiment of the present invention, in detail.

FIG. 9 is a view illustrating a main portion which is extracted from an oil supply device according to a second embodiment of the present invention. In the present embodiment, in addition to the system configuration illustrated in FIG. 2, a flow rate and oil pressure increase prediction device (flow rate and oil pressure increase prediction means) 23 is provided. The flow rate and oil pressure increase prediction device 23 predicts an increase of a flow rate of oil or an oil pressure based on various control signals or measured values of a sensor. For example, various control signals include a gear-change demand, a lubrication-cooling demand, a shift-down demand in a manual mode, a state of a brake switch, or the like. The measured values of various sensors include an amount of variation of a throttle opening (accelerator opening, amount of intake air), a stepping force of a brake pedal, a brake oil pressure, an amount of brake stroke and/or a brake speed, or the like. Any one of the control signals or the measured values of the sensors is selectively used. In addition, a drive state of motor M is controlled so as to be an optimum state based on prediction with respect to increases of the flow rate and the oil pressure.

In this way, by predicting the increase of the flow rate of oil or the oil pressure based on various control signals or signals from existing sensors, it is possible to prevent complication of the system configuration.

In addition, by changing a control program of control unit 20 and predicting increases of the flow rate of oil or the oil pressure based on various control signals or signals from existing sensors, it is possible to use control unit 20 as flow rate and oil pressure increase prediction device 23.

Since other basic configurations are similar to those of the first embodiment, in FIG. 9, the same reference numerals are assigned to the same portions as those of FIG. 2, and detailed descriptions thereof are omitted.

Next, various usage examples of the oil supply device according to the second embodiment will be described.

USAGE EXAMPLE 1

In Usage example 1,, since motor M is used for assist of engine 1 and motor M is driven according to a target flow rate of oil, the motor rotating speed increases when it is predicted and detected that a target value is increased by flow rate and oil pressure increase prediction device 23.

Specifically, motor M stops when a relationship of "engine speed>motor rotating speed" and a relationship of "motor rotating speed>first predetermined value" are satisfied, and assist restarts when "motor rotating speed second predetermined value" is satisfied. Here, timing when the assist ends is timing when one-way clutch 9 enters an OFF state. Meanwhile, timing of the second predetermined value when the assist restarts is timing when one-way clutch 9 enters an ON state.

Accordingly, responsiveness of a required flow rate of oil is improved, and an engine load is decreased by continuity of the assist of the motor.

USAGE EXAMPLE 2

In Usage example 2,, since lubrication and cooling are improved by increasing a flow rate of oil, when an oil temperature measured by oil temperature sensor 30 is a predetermined value or more (high temperature), motor M is driven so as to increase the rotating speed of motor M so that "engine speed<motor rotating speed" is satisfied, and motor M is controlled so that the flow rates of lubrication and cooling increases. According to this control, by increasing a flow rate of oil while avoiding an increase of the engine speed, it is possible to secure the flow rates of lubrication and cooling, which is effective at the time of high-speed traveling or at the time of a traffic jam.

Meanwhile, when an oil temperature is a predetermined value or less (low temperature), motor M is driven so that "engine speed<motor rotating speed" is satisfied. Accordingly, warming up (oil temperature increase) is able to be expected due to heat generated by motor M.

In this way, a motor operation is changed based on an oil temperature state. In addition, for example, since the viscosity of oil increases at a low oil temperature and a driving load of a pump increases, an assist amount of the motor increases as an oil temperature decreases. In this case, a rotating speed generating a required flow rate of oil becomes an upper limit of a target rotating speed of the motor. When there is sufficient power in motor M, since the pump rotating speed exceeding the upper limit of the target rotating speed of the motor goes to waste, the motor is controlled so that the rotating speed does not exceed the target rotating speed. Meanwhile, when there is not sufficient power in motor M, since motor M is fully driven, an amount of current or a driving time is set within a range in which heat resistance of the motor is able to be assured.

USAGE EXAMPLE 3

For example, due to a low temperature environment or the like, oil with a high viscosity is generated oil becomes a gel-like material having a high viscosity, and the assist of the motor is set so that the assist of the motor is not permitted in a region in which the motor cannot be driven considering capability of the motor. For example, when an oil temperature (may be a temperature of a motor or the like) measured by oil temperature sensor 30 is lower than a first predetermined value, driving of the motor is not permitted. In addition, when the oil temperature is a second predetermined value or more, driving of the motor is permitted. As other conditions, when a voltage is not sufficient due to a low voltage supply, this control cannot be performed due to failure (for example, relay) of other parts, or an amount of the controllable operation is not sufficient, assist of the motor is set to be not permitted.

USAGE EXAMPLE 4

In Usage example 4,, a position of a cylinder is adjusted. A crank shaft of engine 1 is rotated by rotating motor M inversely after the engine stops, and a specific cylinder is moved to a preset position. Since one-way clutch 9 is locked when one-way clutch is inversely rotated, if motor M is inversely rotated after the engine stops, the output shaft of the engine is able to be also rotated. Using this, the crank shaft is rotated when the engine stops, a specific cylinder is adjusted so as to be positioned at a position at which startability is improved, and it is possible increase startability of engine 1.

USAGE EXAMPLE 5

At the time of the idle reduction, since a flow rate of oil leaking from oil pump 7 increases as oil temperature increases, the target rotating speed of motor M is controlled so as to be increased as the oil temperature measured by oil temperature sensor 30 increases. For example, in the oil-pressure holding operation, a current flowing to motor M is controlled. Meanwhile, when a temperature of oil is low, the flow rate of oil leaking from oil pump 7 decreases. However, when the temperature of oil is very low, since viscosity of the oil increases and pressure loss increases, the target rotating speed of motor M is set considering capacity efficiency of oil pump 7 at each oil temperature. In addition, the consideration is not limited to the oil temperature, and the target rotating speed of motor M may be set according to a change content of each portion at driving conditions, in addition to a water temperature.

USAGE EXAMPLE 6

By providing a mechanism which increases an oil temperature of a transmission using a cooling water, it is possible to achieve early warming up.

USAGE EXAMPLE 7

When a rapid increase of an oil temperature occurs, if motor M is controlled by a value measured by oil temperature sensor 30, a difference between an actual oil temperature and a measured oil temperature is generated, and a supplied amount of oil may be not sufficient. Accordingly, when the difference between oil temperatures being generated is predicted by the flow rate and oil pressure increase prediction device 23 and the difference between oil temperatures is predicted, a target value of the supplied amount of the oil is increased. In the flow rate and oil pressure increase prediction device 23, it is possible to predict that the difference between the actual oil temperature and the measured oil temperature is generated from a rising rate of an oil temperature per unit time, or an engine speed, a vehicle speed, a high oil pressure, or the like which are a main factors which increase an oil temperature.

USAGE EXAMPLE 8

When an OFF state of one-way clutch 9 fails (when disengagement of one-way clutch 9 fails), since oil pump 7 cannot be driven by the driving force of the engine, oil pump 7 is driven only by motor M. In this case, since an oil pressure is set according to an output of the motor, a driving force input into a transmission is decreased by limiting the driving force of the engine, fixing a transmission gear ratio, or the like so as to limit traveling.

USAGE EXAMPLE 9

After the engine starts, by confirming an oil pressure reaching a specific oil pressure in a state in which assist of the motor is not performed, it is possible to perform OFF failure diagnosis of one-way clutch 9. For example, at the time of an idle rotation, when an output value of an oil-pressure sensor is less than 0.3, MPa and a target oil pressure is the maximum value, OFF failure of one-way clutch 9 is determined.

Third Embodiment

Figure 10:
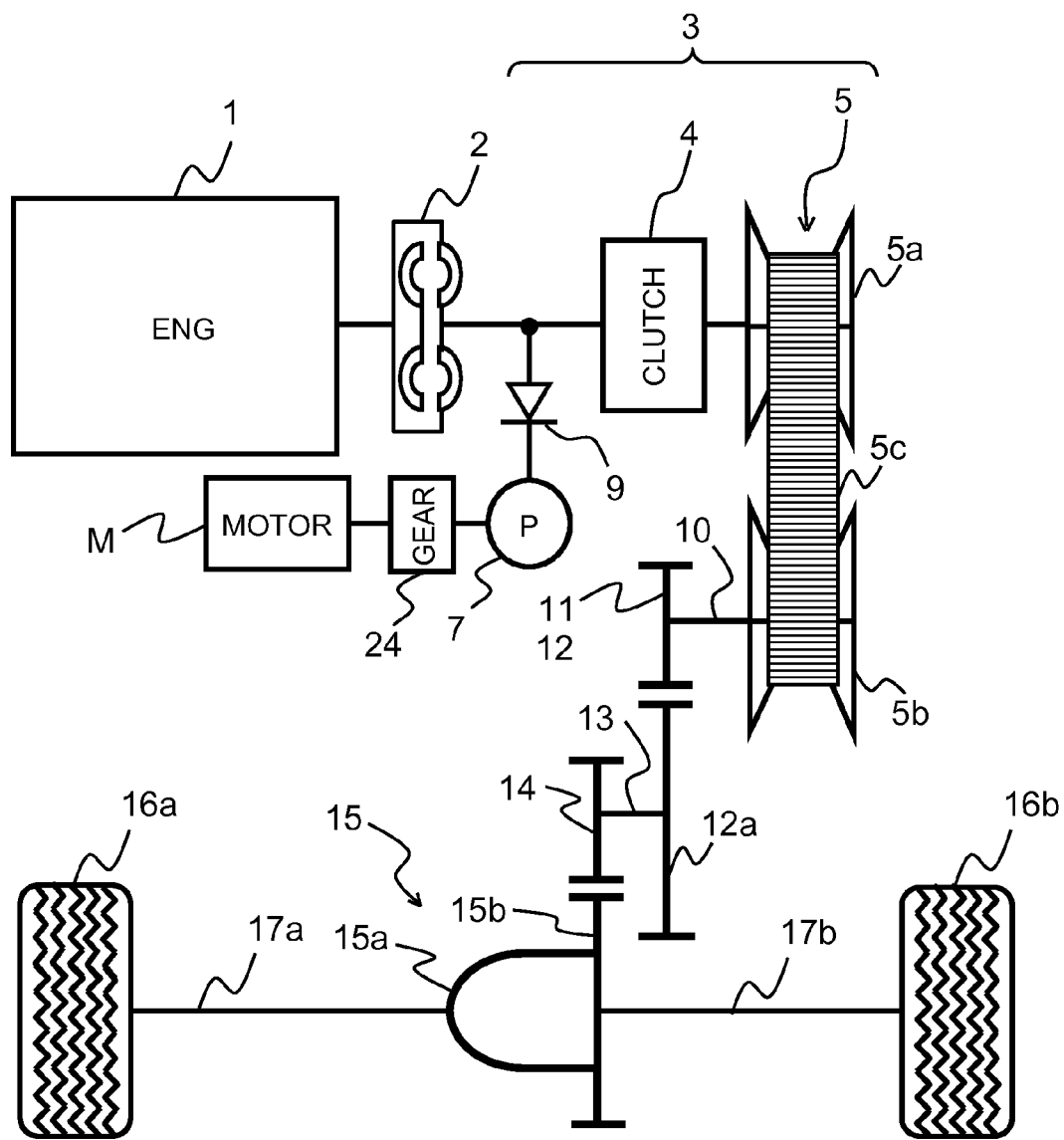
FIG. 10 illustrates an oil supply device according to a third embodiment of the present invention, and is a schematic view when the oil supply device is applied to an automatic transmission mounted on a vehicle.

FIG. 10 illustrates an oil supply device according to a third embodiment of the present invention, and is a schematic view when the oil supply device is applied to an automatic transmission mounted on a vehicle. In the present embodiment, a gear wheel (gear) 24 is provided between oil pump 7 and motor M.

Since other basic configurations are similar to those of the first and second embodiments, in FIG. 10, the same reference numerals are assigned to the same portions as those of FIG. 1, and detailed descriptions thereof are omitted.

By decelerating the rotation of motor M by gear wheel 24, it is possible to prevent an increase in the size of the motor while specializing in a specific rotation region (low-speed region). In this way, by adding the deceleration gear, a low-speed rotation region in which efficiency of the engine is low is able to be positively used for assist. In addition, even when a load of oil pump 7 is large, oil pump 7 is able to be driven by motor M having small capacity by performing deceleration. In addition, if motor M has large capacity, motor M is able to be used in a state in which a speed of motor M increases, and it is possible to increase an assist region by increasing the rotating speed of motor M.

Since if motor M is rotated at a low speed, the rotation of motor M is decelerated and high torque is obtained, and if motor M is rotated at a high speed, the rotation of motor M is accelerated but low torque is obtained, for example, both high torque and a high-speed rotation are able to be obtained by configuring motor M so as to change a speed of the motor in two stages. Accordingly, by setting a transmission gear ratio using gear wheel 24, it is possible to freely set an assist region and a driving force.

Figure 11:
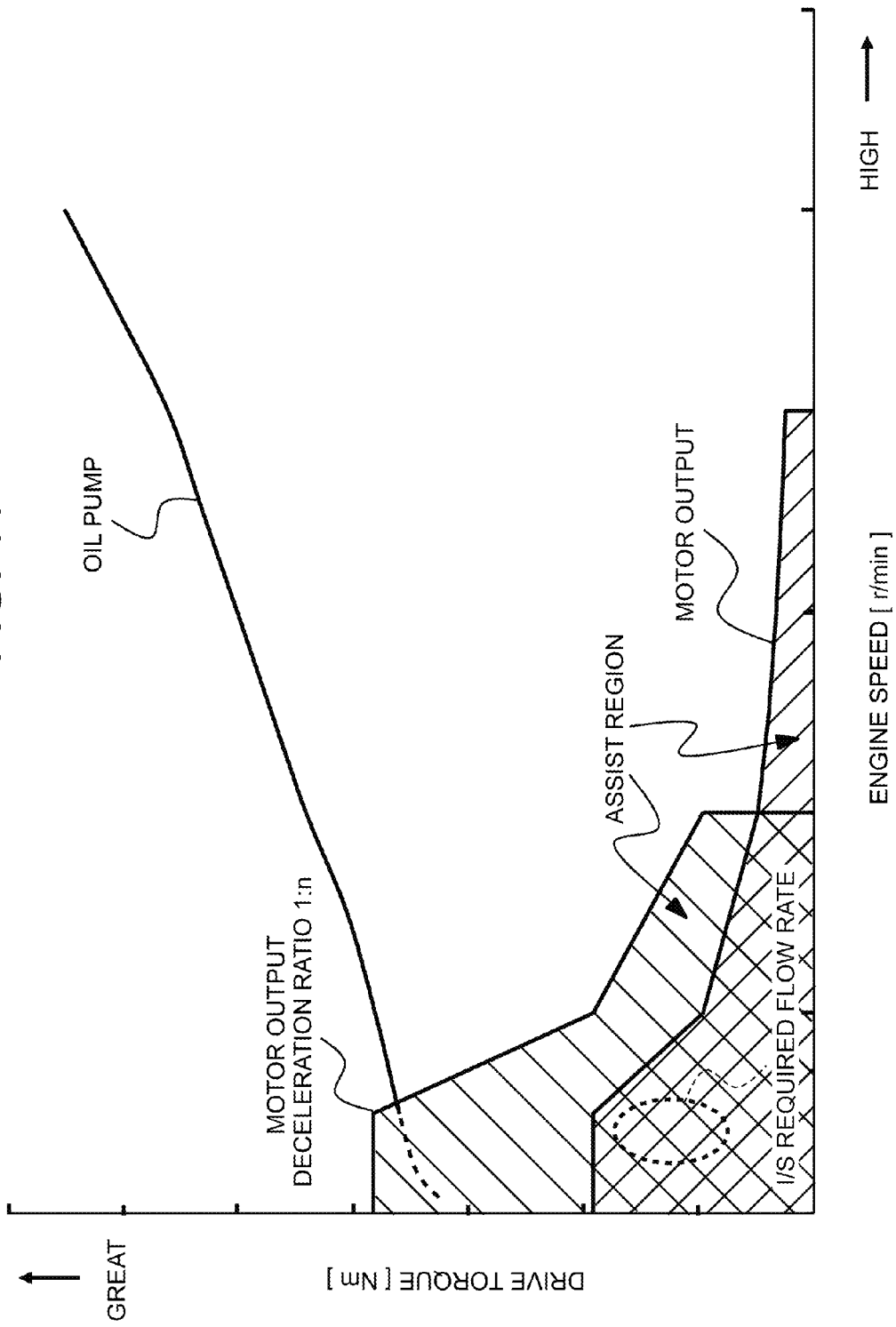
FIG. 11 is a characteristic diagram illustrating a relationship between an engine speed and a drive torque when an assist operation is performed in a system configuration of FIG. 10.

FIG. 11 is a characteristic diagram illustrating a relationship between the engine speed and the drive torque when an assist operation is performed in the system configuration of FIG. 10. Here, an example in which a reduction ratio 1:n of gear wheel 24 satisfies n=2, is described. Drive torque which increases according to an increase of the engine speed is applied to oil pump 7.

When the motor is not decelerated by gear wheel 24, an output of the motor decreases according to an increase of the rotation of the motor, and the drive torque is obtained for assist.

Meanwhile, if the motor is decelerated at a reduction ratio 1:2, by gear wheel 24, although the output of the motor decreases according to an increase of the rotation of the motor, the drive torque which is larger by ½ of the engine speed when the motor is not decelerated, that is, an approximately two times larger driving torque is obtained for assist.

In this way, in either case, a required oil flow rate at the time of idle reduction (I/S required flow rate) which is illustrated so as to be surrounded by a dashed line is able to be satisfied. However, by decelerating the rotation of motor M using gear wheel 24, a low-speed rotation region in which efficiency of the engine is low is able to be positively used for assist due to a large driving force.

Figure 12:
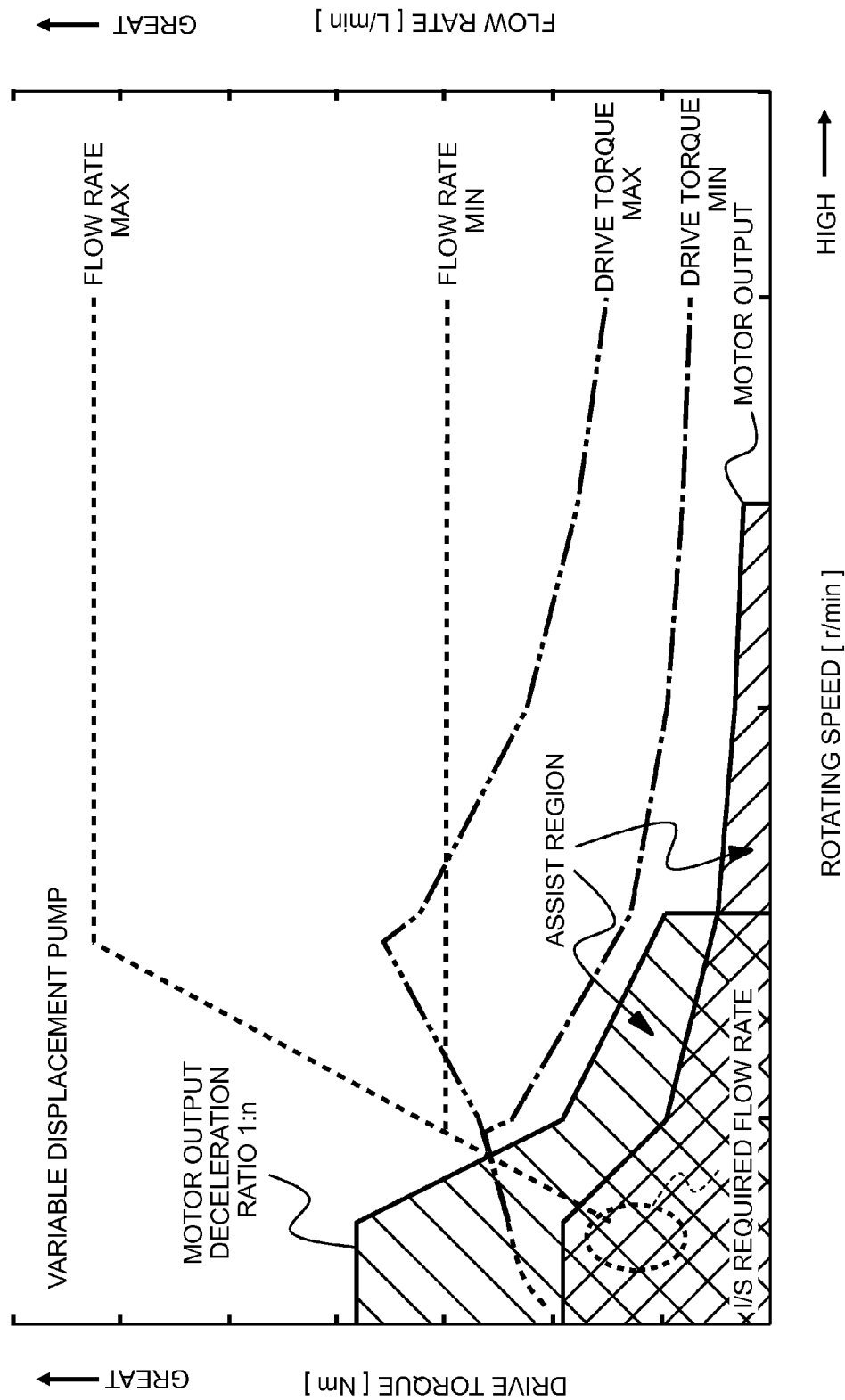
FIG. 12 is a characteristic diagram illustrating a relationship between an engine speed and a drive torque when a variable displacement pump is adopted and an assist operation is performed in a system configuration of FIG. 10.

FIG. 12 is a characteristic diagram illustrating a relationship between an engine speed and a drive torque when a variable displacement pump is adopted and an assist operation is performed in a system configuration of FIG. 10. Here, similar to FIG. 11, an example in which a reduction ratio 1:n of gear wheel 24 satisfies n=2, is described. In the drive torque of oil pump (variable displacement pump) 7, peaks when the drive torque is minimum (drive torque min) and when the drive torque is maximum (drive torque max) are different from each other. However, in either case, after the drive torque increases at similar rates of increase until the oil pump reaches a predetermined rotating speed, the drive torque gradually decreases.

Moreover, after each of flow rates (flow rate min and flow rate max) of oil increases at similar rates of increase until the oil pump reaches a predetermined rotating speed, the flow rate is constant. Drive torque min, drive torque max, flow rate min, and flow rate max are determined according to specifications of the variable displacement pump.

In the variable displacement pump, there is a variable region in which a flow rate is changed according to a rotating speed, and a region in which the flow rate of oil is constant after the pump reaches a predetermined rotating speed. Accordingly, it is possible to make a flow rate of discharged oil be constant even when the rotating speed increases, and in a high-speed rotation region, it is possible to decrease the drive torque.

Therefore, even when the variable displacement pump is used, it is possible to obtain sufficient assist effects by specializing in a specific region.

In addition, when the variable displacement pump is used, capacity (size) of the motor or decelerator (gear wheel 24) may be added so that the pump is used in a region other than the variable region and motor assist is able to be performed.

In this way, even when the variable displacement pump is used for oil pump 7, as illustrated so as to be surrounded by a dashed line, the I/S required flow rate is able to be satisfied. In addition, by decelerating the rotation of motor M at a predetermined reduction ratio 1:n using gear wheel 24, a low-speed rotation region in which efficiency of the engine is low is able to be positively used for assist due to a large driving force according to the reduction ratio.

Fourth Embodiment

Figure 13:
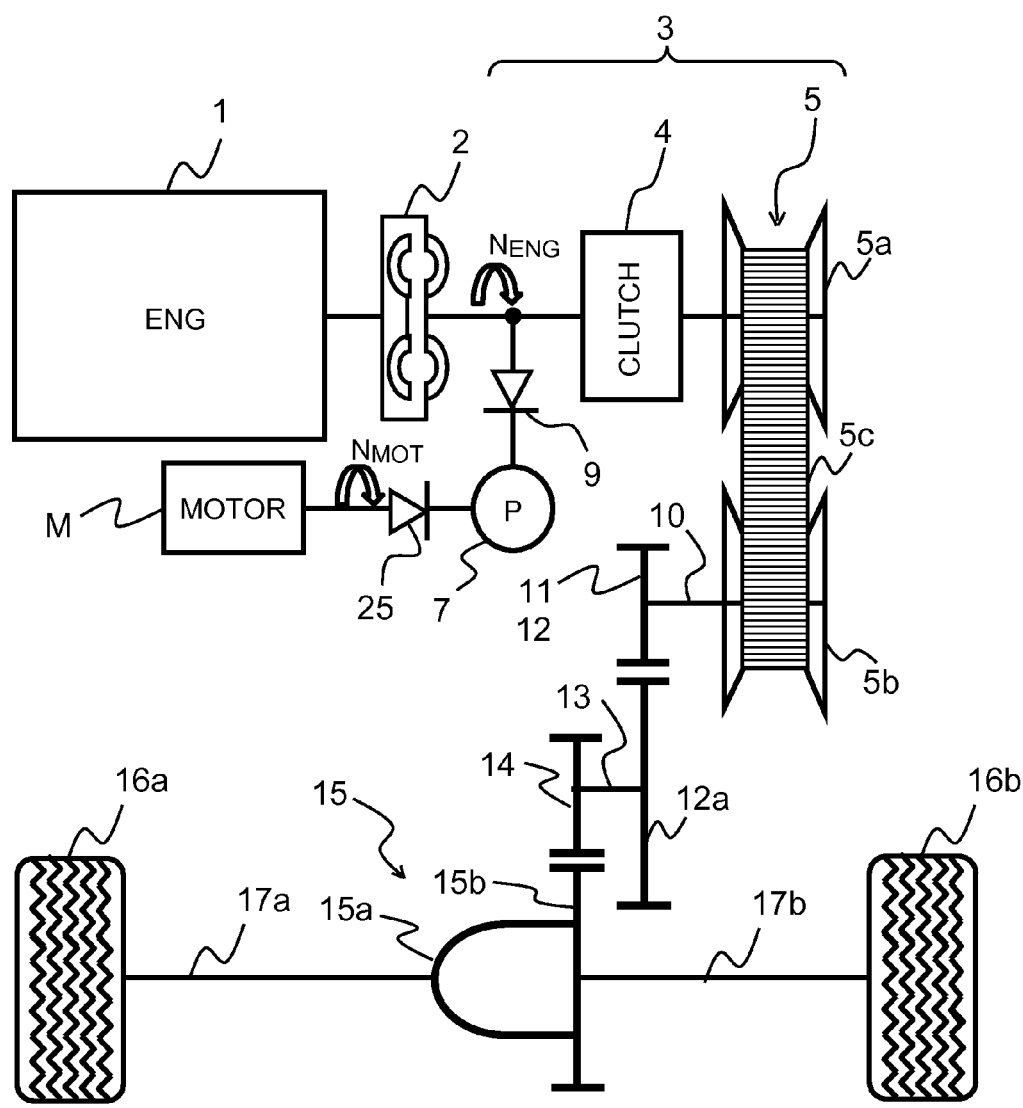
FIG. 13 illustrates an oil supply device according to a fourth embodiment of the present invention, and is a schematic view when the oil supply device is applied to an automatic transmission mounted on a vehicle.

FIG. 13 illustrates an oil supply device according to a fourth embodiment of the present invention, and is a schematic view when the oil supply device is applied to an automatic transmission mounted on a vehicle. In the present embodiment, a transmittable and interruptible element, that is, a second one-way clutch 25 (second engagement and disengagement means) which is an engagement and disengagement element is provided between oil pump 7 and motor M.

Since other basic configurations are similar to those of the first to third embodiments, in FIG. 13, the same reference numerals are assigned to the same portions as those of FIGS. 1 and 10, and detailed descriptions thereof are omitted.

In each of first and second one-way clutches 9 and 25, when a relationship between an engine speed $N_{ENG}$, and a motor rotating speed $N_{MOT}$, satisfies "$N_{ENG} > N_{MOT}$", one-way clutch 9 enters an ON state (engagement), and one-way clutch 25 enters an OFF state (disengagement). In addition, when the relationship satisfies "$N_{ENG} < N_{MOT}$", one-way clutch 25 enters an ON state (engagement), and one-way clutch 9 enters an OFF state (disengagement). Here, when the relationship satisfies "$N_{ENG} = N_{MOT}$", one-way clutch 9 or 25 enters an engagement state.

In addition, when the motor rotating speed is controlled, it is necessary to identify the pump rotating speed. For example, the pump rotating speed is able to be estimated using an engine speed sensor, a motor position sensor, or the like.

In this way, by providing second one-way clutch 25, when oil pump 7 is driven by only engine 1, it is possible to release co-rotation of motor M. Particularly, when motor M which is specialized in a low-speed rotation region of the engine is adopted, effects to decrease a load increase, and it is possible to prevent an increase in costs which is generated due to a high-speed bearing or seal. Moreover, when the maximum value of the rotating speed of motor M is 4000, r/min, if motor M is decelerated, motor M is rotated at a speed equal to or more than 4000, r/min. However, it is possible to detach motor M using one-way clutch 25 at the time of high-speed rotation.

Accordingly, it is possible to increase a degree of freedom of the control or use of motor M. In addition, if motor M and oil pump 7 are directly connected to each other, there is a concern that a vehicle may not depart when the motor fails. However, since second one-way clutch 25 is provided, it is possible to detach motor M, and reliability is also improved.

Figure 14:
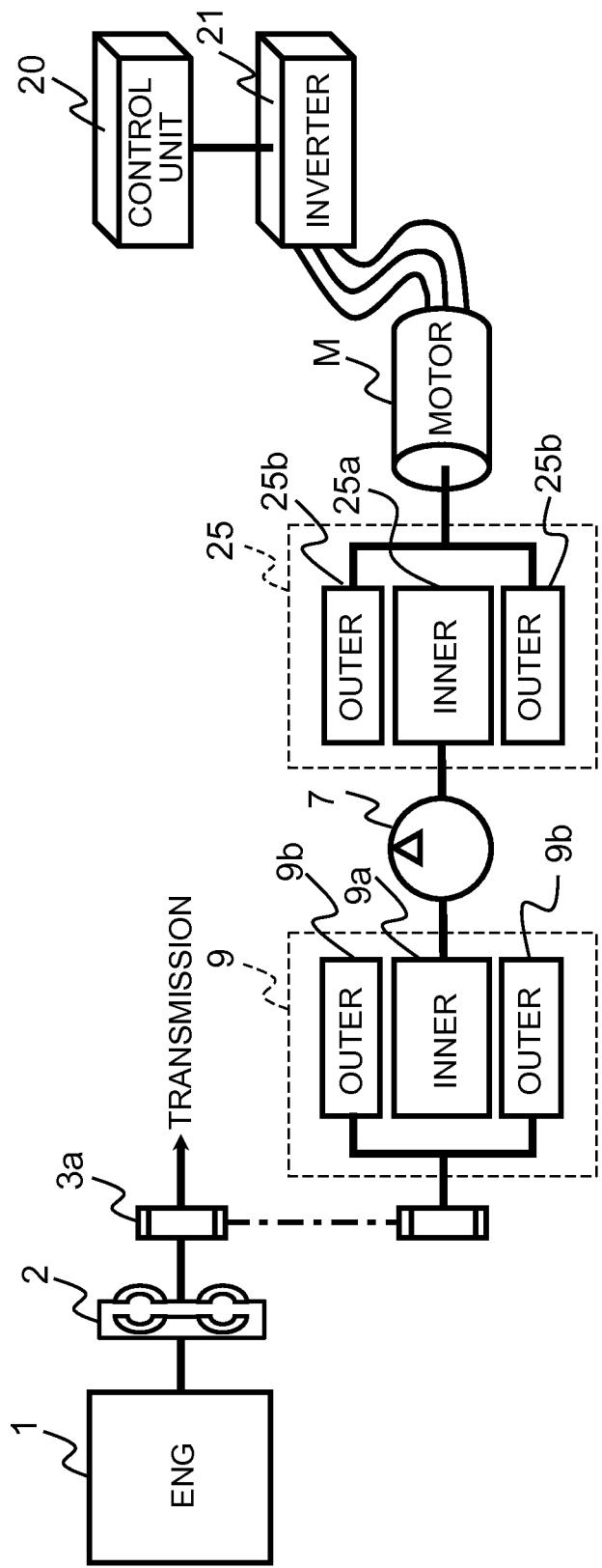
FIG. 14 is a view illustrating configuration examples of a first and second one-way clutch in a system illustrated in FIG. 13.

FIG. 14 is a view illustrating a configuration example of the engagement and disengagement element in the system illustrated in FIG. 13. In the present example, the drive shaft (pump shaft) of oil pump 7 is connected to inners 9a, and 25a having smaller inertia of one-way clutches 9 and 25, and outers 9b, and 9b, of one-way clutch 9 are connected to the output shaft of engine 1 by sprocket 3a. Moreover, outers 25b, and 25b, of one-way clutch 25 are connected to the output shaft (pump shaft) of motor M.

In above-described configuration, when the rotations of outers 9b, and 9b, of one-way clutch 9 is faster than rotation of inner 9a,, one-way clutch 9 enters an ON (engagement) state, and oil pump 7 is driven by the driving force of engine 1. In this case, if the rotation of motor M is slower than the rotation of the engine, since the rotations of outers 25b, and 25b, of one-way clutch 25 are slower than the rotation of inner 25a,, one-way clutch 25 enters an OFF (disengagement) state, and motor M is separated from oil pump 7.

Meanwhile, if the rotation of motor M is faster than the rotation of the engine, since the rotations of outers 25b, and 25b, of one-way clutch 25 are faster than the rotation of inner 25a,, one-way clutch 25 enters an ON (engagement) state, and oil pump 7 is driven by motor M. In this case, since the rotations of outers 9b, and 9b, of one-way clutch 9 are faster than the rotation of inner 9a,, one-way clutch 9 enters an OFF (disengagement) state, and oil pump 7 is driven by the driving force of motor M.

In this way, switching of power of oil pump 7 at the time of idle reduction is able to be performed by the difference between rotating speeds of engine 1 and motor M.

In addition, similar to FIG. 4, instead of one-way clutches 9 and/or 25, a mechanical clutch, for example, a friction clutch, a claw clutch, a single plate clutch, a centrifugal clutch, an electromagnetic clutch, or the like may be used.

Fifth Embodiment

Figure 15:
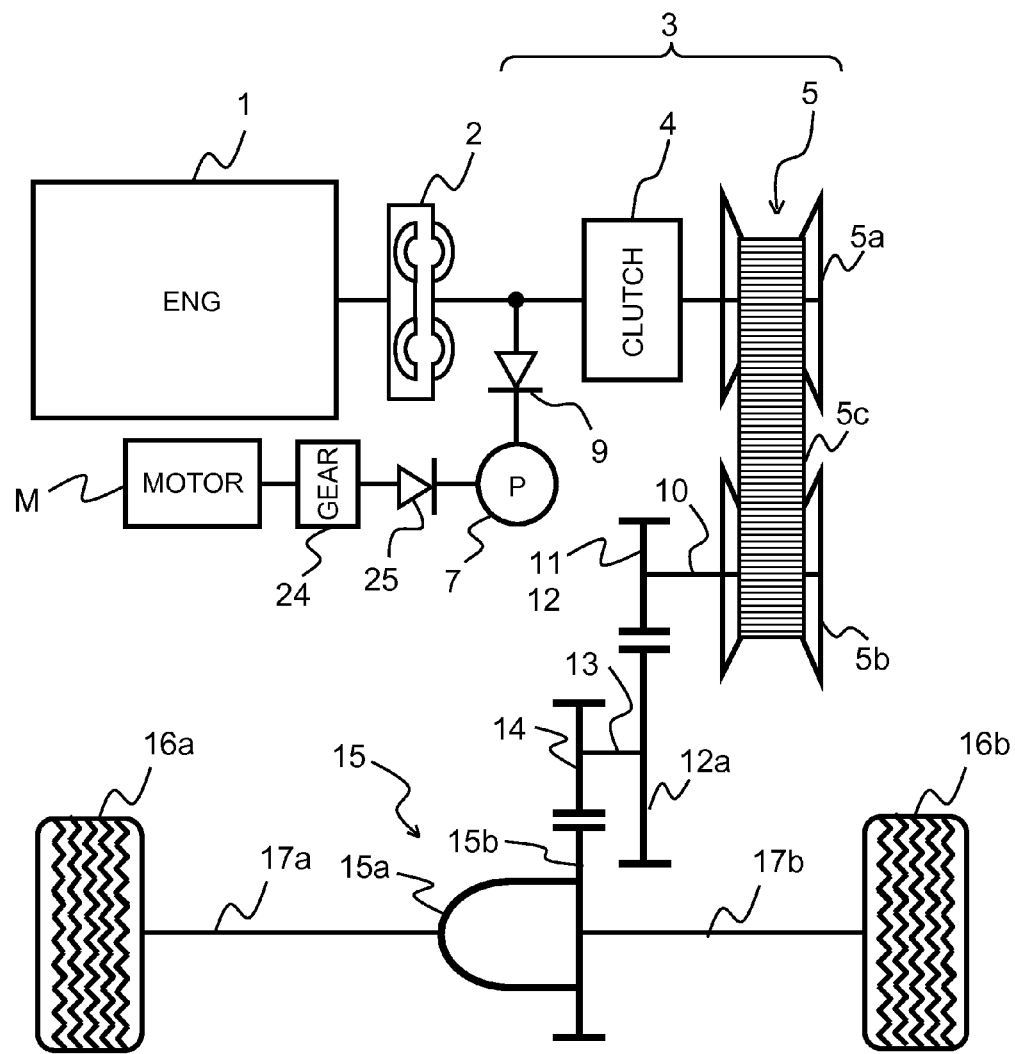
FIG. 15 illustrates an oil supply device according to a fifth embodiment of the present invention, and is a schematic view when the oil supply device is applied to an automatic transmission mounted on a vehicle.

FIG. 15 illustrates an oil supply device according to a fifth embodiment of the present invention, and is a schematic view when the oil supply device is applied to an automatic transmission mounted on a vehicle. In the present embodiment, a transmittable or interruptible element, that is, one-way clutch 25 which is the engagement and disengagement element is provided between oil pump 7 and motor M, and gear wheel (gear) 24 is provided between one-way clutch 25 and motor M.

Since other basic configurations are similar to those of the first to fourth embodiments, in FIG. 15, the same reference numerals are assigned to the same portions as those of FIGS. 1, 10, and 13, and detailed descriptions thereof are omitted.

In this configuration, in addition to effects according to the fourth embodiment, effects according to the third embodiment are able to be obtained.

In addition, in the first to fifth embodiments, examples in which the embodiments are applied to an oil pump of an automatic transmission are described. However, the embodiments may be similarly applied to a supply device of oil such as lubricant.

In addition, similar to the second embodiment, in the third to fifth embodiments, flow rate and oil pressure increase prediction device 23 may be provided, and controls, configurations, methods, or the like described in Usage examples 1, to 9, may be appropriately combined.

REFERENCE SYMBOL LIST

1 Engine (driving motor)
7 Oil pump
9, 25 One-way clutch (engagement and disengagement means)
22 Mechanical clutch (engagement and disengagement means)
M Motor

The invention claimed is:

1. An oil supply device, comprising:
an oil pump which is driven by a driving motor of a vehicle and a motor separate from the driving motor; and
a first clutch which transmits and interrupts a driving force of the driving motor to the oil pump,
wherein the oil pump is selectively driven by one or both of the driving motor and the motor, the motor drives the oil pump without using a drive system of the driving motor, and the motor assists a driving force of the oil pump generated by the driving motor when the driving motor is rotated at a low speed, and
wherein an OFF failure diagnosis of the first clutch is performed by confirming an oil pressure reaching a specific oil pressure in a state in which assist of the motor is not performed after the driving motor starts.

2. The oil supply device according to claim 1,
wherein the first clutch is a first one-way clutch.

3. The oil supply device according to claim 2,
wherein the first one-way clutch engages the driving motor and the oil pump with each other when a rotating speed of a driving portion driven by the driving motor is higher than a rotating speed of the motor, and disengages the driving motor and the oil pump from each other when the rotating speed of the driving portion driven by the driving motor is lower than the rotating speed of the motor.

4. The oil supply device according to claim 1,
wherein the first clutch is a mechanical clutch which is in an engagement state when the oil pump is driven by the driving motor, and is in a disengagement state when the oil pump is driven by the motor.

5. The oil supply device according to claim 4,
wherein the mechanical clutch includes any one of a friction clutch, a claw clutch, a single plate clutch, a centrifugal clutch, and an electromagnetic clutch.

6. The oil supply device according to claim 2,
wherein when the oil pump is driven by the driving motor, the motor is operated so that a target rotating speed of the motor is equal to or more than a rotating speed of the driving motor, so as to assist driving force of the oil pump generated by the driving motor.

7. The oil supply device according to claim 1,
wherein the motor assists the driving force of the oil pump generated by the driving motor, according to a driving condition of the vehicle.

8. The oil supply device according to claim 1,
wherein when a driving load of the driving motor increases, the motor assists the driving force of the oil pump generated by the driving motor.

9. The oil supply device according to claim 1, further comprising:
a flow rate and oil pressure increase prediction device for predicting increases of a flow rate of oil and an oil pressure based on a control signal and a measured value of a sensor,
wherein a drive state of the motor is controlled based on prediction with respect to the increases of the flow rate and the oil pressure.

10. The oil supply device according to claim 9,
wherein the control signal includes at least one of a gear-change demand, a lubrication-cooling demand, a shift-down demand in a manual mode, and a state of a brake switch, and the measured value of the sensor includes at least one of an amount of variation in a throttle opening, a stepping force of a brake pedal, a brake oil pressure, and an amount of a brake stroke and/or a brake speed.

11. The oil supply device according to claim 1, further comprising:
a gear which decelerates a rotation of the motor and drives the oil pump.

12. The oil supply device according to claim 1, further comprising:
a second clutch which transmits a driving force of the motor to the oil pump.

13. The oil supply device according to claim 12,
wherein the second clutch is a second one-way clutch.

14. The oil supply device according to claim 13,
wherein the second one-way clutch engages the motor and the oil pump with each other when a rotating speed of a driving portion driven by the driving motor is lower than a rotating speed of the motor, and disengages the motor and the oil pump from each other when the rotating speed of the driving portion driven by the driving motor is higher than the rotating speed of the motor.

15. The oil supply device according to claim 12,
wherein the second clutch is a mechanical clutch which is in a disengagement state when the oil pump is driven by the driving motor, and is in an engagement state when the oil pump is driven by the motor.

16. The oil supply device according to claim 15,
wherein the mechanical clutch includes any one of a friction clutch, a claw clutch, a single plate clutch, a centrifugal clutch, and an electromagnetic clutch.

17. The oil supply device according to claim 12, further comprising:
a gear which decelerates a rotation of the motor and transmits the decelerated rotation to the second clutch.

18. The oil supply device according to claim 1,
wherein the motor assists the driving force of the oil pump generated by the driving motor in at least one of when the driving motor starts, when the driving motor is actuated, when the driving motor idles, and before the driving motor is stopped by coasting reduction.

19. The oil supply device according to claim 7,
wherein the motor assists the driving force of the oil pump generated by the driving motor in at least one of a departure state, an acceleration state, and a normal state of the vehicle.

20. The oil supply device according to claim 1,
wherein generation is performed in at least one of when a vehicle normally travels and when a vehicle is decelerated, using co-rotation of the motor generated by driving the oil pump by the driving motor.

* * * * *